(12) United States Patent
Feng et al.

(10) Patent No.: US 8,296,109 B2
(45) Date of Patent: Oct. 23, 2012

(54) METHODS AND SYSTEMS FOR ENABLING SIMULATION OF AGING EFFECT OF A CHRONO-RHEOLOGICAL MATERIAL IN COMPUTER AIDED ENGINEERING ANALYSIS

(75) Inventors: William W. Feng, Lafayette, CA (US); John O. Hallquist, Livermore, CA (US)

(73) Assignee: Livermore Software Technology Corporation, Livermore, CA (US)

( * ) Notice: Subject to any disclaimer, the term of this patent is extended or adjusted under 35 U.S.C. 154(b) by 694 days.

(21) Appl. No.: 12/426,913

(22) Filed: Apr. 20, 2009

(65) Prior Publication Data

US 2010/0268483 A1    Oct. 21, 2010

(51) Int. Cl.
*G06G 7/48* (2006.01)
(52) U.S. Cl. .......................................................... 703/7
(58) Field of Classification Search .................. 703/7, 1; 720/694
See application file for complete search history.

(56) References Cited

U.S. PATENT DOCUMENTS 7,308,387 B1 * 12/2007 Feng et al. ........................ 703/1
2003/0080957 A1 * 5/2003 Stewart et al. ................ 345/420

OTHER PUBLICATIONS

Yang et al., A visco-hyperelastic approach to modelling the constitive behaviour of rubber, 2000, Elsevier Science, pp. 545-560.*
Feng et al., Numerical Modelling and Biaxial Tests for the Mullins Effect in Rubber, May 2007, Livermore Software Technology Corp., pp. 1-26.*
Rasmussen et al., Inflation of polymer melts into elliptic and circular cylinders, Apr. 2000, Elsevier Science, pp. 245-263.*

* cited by examiner

*Primary Examiner* — Dwin M Craig
*Assistant Examiner* — Bernard E Cothran
(74) *Attorney, Agent, or Firm* — Roger H. Chu (57) ABSTRACT

Methods and systems for enabling simulation of material aging effect of chrono-rheological materials in computer aided engineering (CAE) analysis are disclosed. According to one aspect, a set of material property tests is conducted for a chrono-rheological material of interest. Each test obtains a series of material properties such as relaxation test data at different age. The relaxation test data are measured by maintaining a specimen of the chrono-rheological material at a predetermined strain. A set of first and second time-dependent material aging effect parameters is determined by shifting and matching the series of relaxation test data between each pair of the tests. The set of first and second time-dependent material aging effect parameters in conjunction with a CAE analysis application module with a chrono-rheological material constitutive equation configured therein are then used for simulating material aging effect by performing a CAE analysis of an engineering structure containing at least in part the chrono-rheological material.

18 Claims, 10 Drawing Sheets

FIG. 4B $$t_i(t) = \frac{1}{J}\left\{\sum_{j=1}^{M}\left[C_j\left(\lambda_i^{b_j} - J^{-nb_j}\right) + \frac{1}{2}\int_0^t g_j(t-\tau)\frac{\partial\left(\lambda_i^{b_j} - J^{-nb_j}\right)}{\partial\tau}d\tau\right]\right\} \quad 502$$

$$J = \lambda_1\lambda_2\lambda_3 \quad i = 1,2,3$$

$$g_j(t) = C_j\left[\sum_{m=1}^{N} R_m e^{-\gamma_m t}\right] = C_j G_j(t) \quad 504$$

$$t_i(t) = \frac{1}{J}\left\{\sum_{j=1}^{M} C_j\left[\lambda_i^{b_j} - J^{-nb_j} + \int_0^t G_j(t-\tau)\frac{\partial\left(\lambda_i^{b_j} - J^{-nb_j}\right)}{\partial\tau}d\tau\right]\right\} \quad 506$$

$$t_i(t_a,t) = \frac{1}{J}\left\{\sum_{j=1}^{M} C_j'(t_a)\left[\lambda_i^{b_j} - J^{-nb_j} + \int_0^t G_j'(t_a, t-\tau)\frac{\partial\left(\lambda_i^{b_j} - J^{-nb_j}\right)}{\partial\tau}d\tau\right]\right\} \quad 508$$

$$\text{where} : C_j'(t_a) = \alpha(t_a)C_j \quad G_j'(t_a, t-\tau) = G_j[\beta(t_a)t]$$

$$\alpha(0) = \beta(0) = 1$$

*FIG. 5A*

$$t_i(t_a,t) = \frac{\alpha(t_a)}{J} \left\{ \sum_{j=1}^{M} C_j \left[ \lambda_i^{b_j} - J^{-nb_j} + \int_0^{\beta(t_a)t} G_j[\beta(t_a)(t-\tau)] \frac{\partial \left( \lambda_i^{b_j} - J^{-nb_j} \right)}{\partial \beta(t_a)\tau} d\beta(t_a)\tau \right] \right\}$$ ⎱512 let $\xi = \beta(t_a)t$ $$t_i(t_a,t) = \frac{\alpha(t_a)}{J} \left\{ \sum_{j=1}^{M} C_j \left[ \lambda_i^{b_j} - J^{-nb_j} + \int_0^{\xi} G_j(\xi-\tau) \frac{\partial \left( \lambda_i^{b_j} - J^{-nb_j} \right)}{\partial \tau} d\tau \right] \right\}$$ ⎱514

$\log t_i |_{t_a} = \log \alpha(t_a) + \log t_i |_{t_a=0, t \to \xi}$
$\log \xi = \log \beta(t_a) + \log t$ $\Rightarrow$ Vertical Shift : $\log \alpha(t_a)$
$\Rightarrow$ Horizontal Shift : $\log \beta(t_a)$

METHODS AND SYSTEMS FOR ENABLING SIMULATION OF AGING EFFECT OF A CHRONO-RHEOLOGICAL MATERIAL IN COMPUTER AIDED ENGINEERING ANALYSIS

FIELD OF THE INVENTION

The present invention generally relates to chrono-rheological materials (e.g., rubber, foam, etc.), more particularly to enabling simulation of material aging effect of a chrono-rheological material in a computer aided engineering analysis (e.g., finite element analysis (FEA), meshless analysis, finite difference analysis, etc.) used for assisting users (e.g., engineers, scientists, etc.) to make decisions in improving and designing an engineering structure containing at least in part the chrono-rheological material.

BACKGROUND OF THE INVENTION

Rubber-like materials (e.g., elastomer, foam) have been used in many parts of engineering structures in various industries (e.g., automotive, aerospace, building, etc.) for years. Rubber-like materials often exhibit chrono-rheological (rheological and aging) behavior. The magnitudes of the chrono-rheological property change with time, and are often large enough that they cannot be neglected.

With advance of the modern computer technologies, an engineering structure (e.g., car, airplane, etc.) is generally designed and improved using computer aided engineering analysis. In order to capture structure responses including the aging effect of rubber-like materials, a numerical representation of the material properties needs to be determined and then incorporated in the application module or software in the computer aided engineering analysis. One of the numerical representations is a material constitutive equation, which relates the material strain-stress or force-displacement relationship. Generally, this is done by conducting specimen test of the material of interest, and then correlating the test results into a particular constitutive equation. However, material constitutive equations for rubber-like materials used in prior art approaches are generally inappropriate. Some are based on the assumption of incompressible elastic properties or certain special cases (e.g., neo-Hookean, Mooney-Rivlin). Others, (e.g., the Ogden equation) may include incompressible and compressible material properties, but not aging effect.

Shortcomings of the prior art approaches creates a problem for simulating the behaviors of elastomeric foam (a compressible and viscoelastic material), which is used extensively in the automotive industry. In particular, one of the industry standards for designing an automobile is to ensure safety of vehicle occupant or occupants in an event of collision or car crash. To ensure satisfying such requirement, automotive manufacturers need to conduct physical crash test of prototype of each vehicle model. In some instances, multiple tests for difference scenarios are required. Not only is physical crash test expensive to conduct, it also has its own set of difficulties and challenges (e.g., measurability, accuracy, reliability, repeatability, etc.). Therefore, computer simulation of a crash event (i.e., computer aided engineering analysis) has been used extensively to replace or at least minimize numbers of the physical prototype crash test.

In a physical crash test, one or more crash dummies are placed in the vehicle to represent human occupant or occupants (i.e., driver or drive plus passenger) to study the safety requirement. Crash dummy is made of a number of parts (e.g., head, torso, limbs, etc.) generally using foam material. Since crash dummy is generally damaged in a physical crash test and repaired thereafter to be reused in another test, different parts of a crash dummy may contain different aged foam material. In order to more accurately simulate such situation (i.e., multiple aged foam materials within one crash dummy), the computer aided engineering application software needs to be able to compute structure responses with a material constitutive equation including aging effect. Therefore, it would be desirable to have improved methods and systems for enabling simulation of material aging effect of a chrono-rheological material in a finite element analysis.

BRIEF SUMMARY OF THE INVENTION

This section is for the purpose of summarizing some aspects of the present invention and to briefly introduce some preferred embodiments. Simplifications or omissions in this section as well as in the abstract and the title herein may be made to avoid obscuring the purpose of the section. Such simplifications or omissions are not intended to limit the scope of the present invention.

The present invention discloses methods and systems for enabling simulation of material aging effect of a chrono-rheological material in a computer aided engineering analysis. According to one aspect, a set of material property tests is conducted to obtain material properties for a chrono-rheological material of interest. The set of material property tests includes repeating substantially similar tests for a plurality of material specimens at different age, for example, days, weeks, months, etc. Each test can be performed through uni-axial, bi-axial, or bending test procedure. A series of relaxation test data is obtained for the specimen under test. In uni-axial test procedure, either tension or compression relaxation tests can be performed, axial stresses at various time are measured. In bi-axial test, the inflation of a round (i.e., circular, oval or elliptical) shaped membrane can be used. The deformation of the membrane can be kept at a constant and inflation pressure (i.e., relaxation test data) is measured. The series of relaxation test data of each material property test are organized or plotted on a relaxation test data chart or graph in logarithm-logarithm scale. Generally, the graph contains a number of series of relaxation test data, each series represents a specific age of the chrono-rheological material of interest.

In another aspect of the present invention, a new material constitutive equation is created to represent chrono-rheological material including material aging effects. The new material constitutive equation is configured to be a generalized and unified formula encompassing existed constitutive equations used in prior art approaches (e.g., neo-Hookean, Mooney-Rivlin, Ogden, etc.). A pair of time-dependent material aging effect parameters is included in the new material constitutive equation. The first parameter is pertinent to relaxation test data of the material denoted as material aging effect parameter alpha ($\alpha$), while the second parameter to time denoted as material aging effect parameter beta ($\beta$). These two parameters can be determined by vertical and horizontal shifting and matching of the relaxation test data in the logarithm-logarithm scaled chart obtained in the material property test. Each series of relaxation test data in the chart represents results obtained for a specific aged specimen. Shifting and matching of each pair of data result into a particular set of material aging effect parameters.

Effects or behaviors of chrono-rheological material properties in a time-marching simulation can be included using a computer aided engineering analysis (CAE) application module with such material constitutive equation configured therein. In general, the set of first and second time-dependent material aging effect parameters are obtained and input to a computer with the CAE application module is installed thereon.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

DETAILED DESCRIPTION

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1A-7. However, those skilled in the art will readily appreciate that the detailed description given herein with respect to these figures is for explanatory purposes as the invention extends beyond these limited embodiments.

Figure 4A:
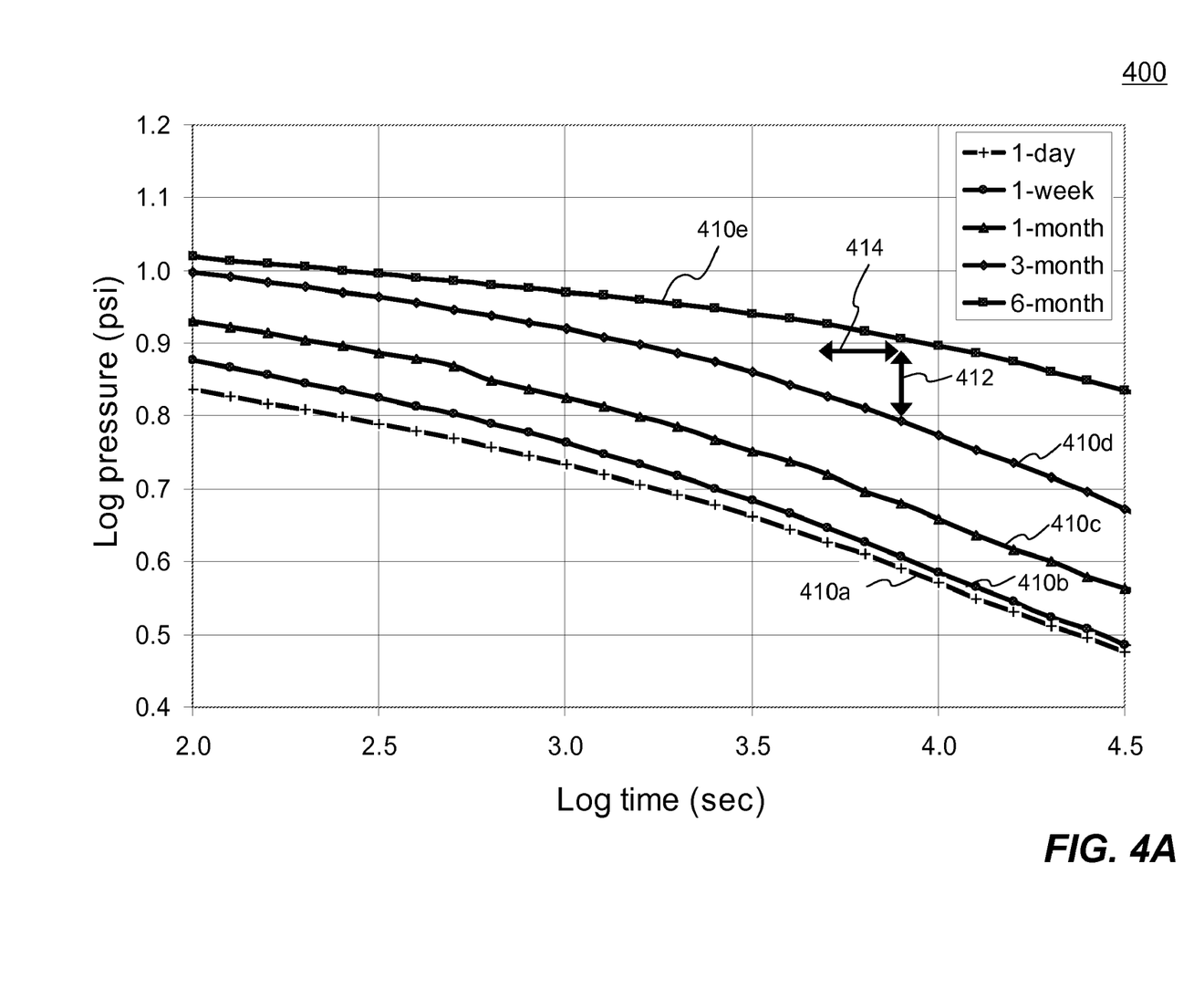
FIG. 4A is a graph showing exemplary relaxation test data obtained from a set of material property tests using bi-axial test procedure, according to an embodiment of the present invention.
Figure 4B:
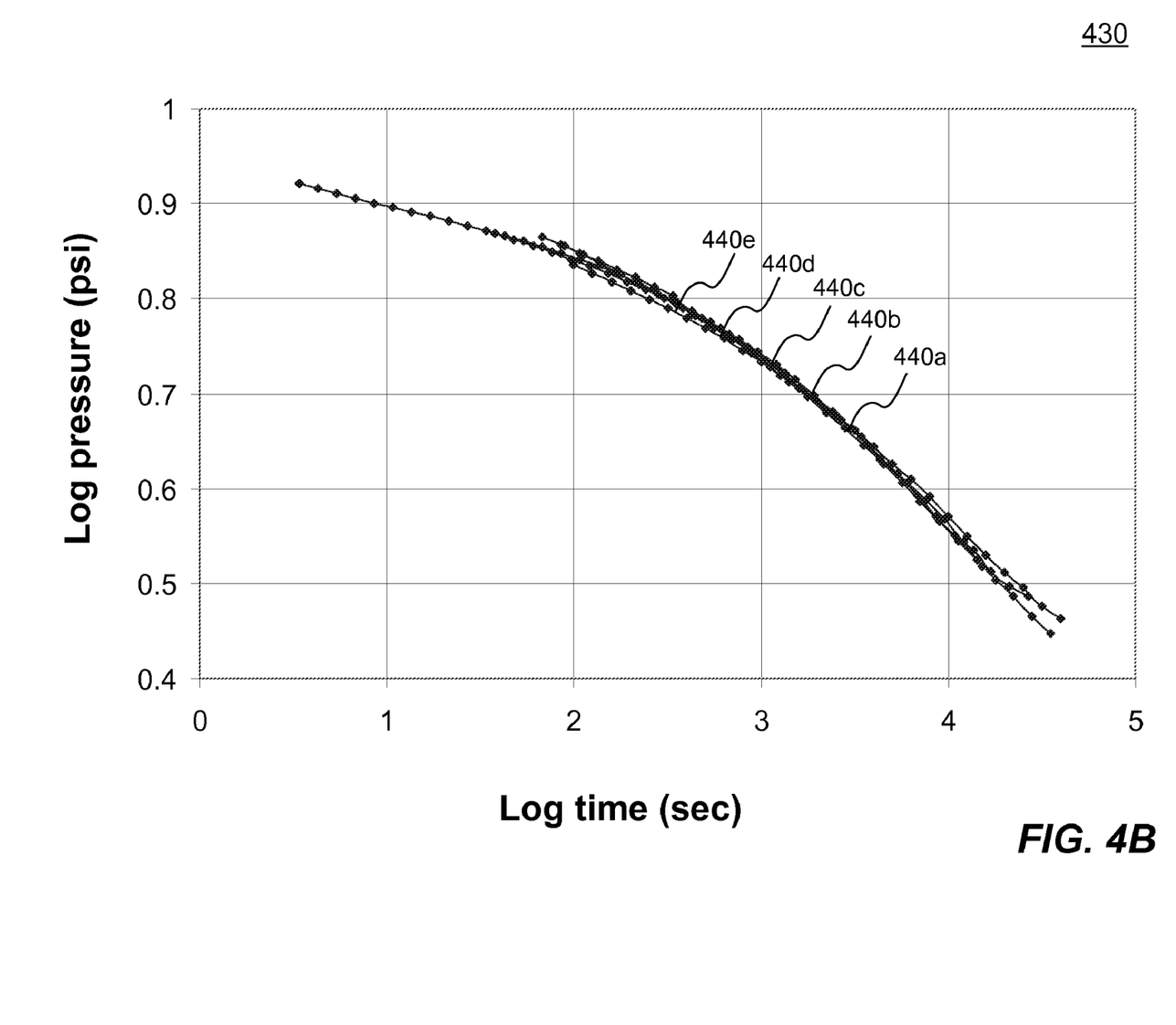
FIG. 4B shows a result after shifting and matching of the relaxation test data of FIG. 4A for determining a set of first and second time-dependent material aging effect parameters.
Figure 5A:
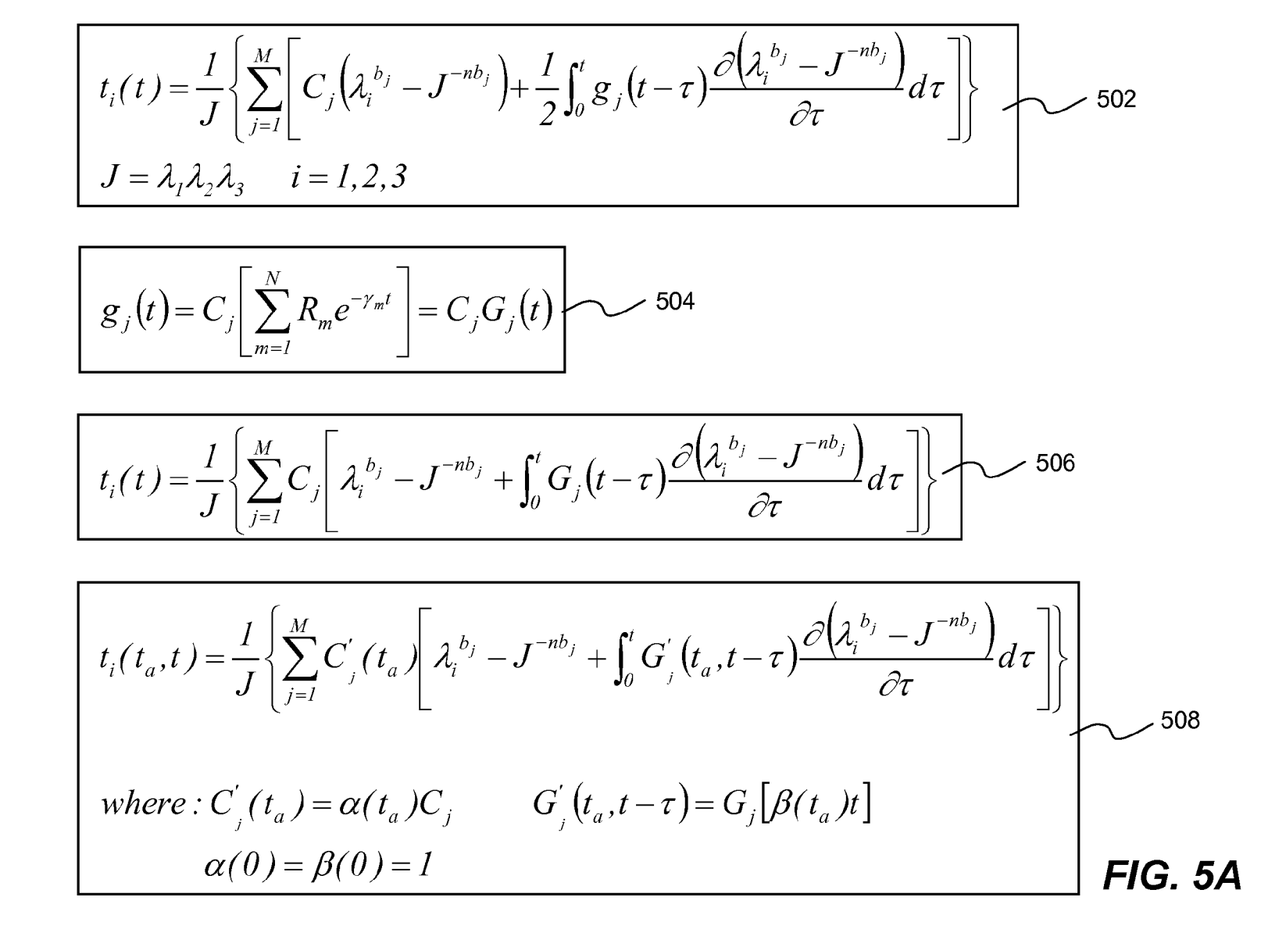
FIGS. 5A and 5B collectively show chrono-rheological material constitutive equation that includes first and second time-dependent material aging effect parameters in accordance with one embodiment of the present invention.
Figure 5B:
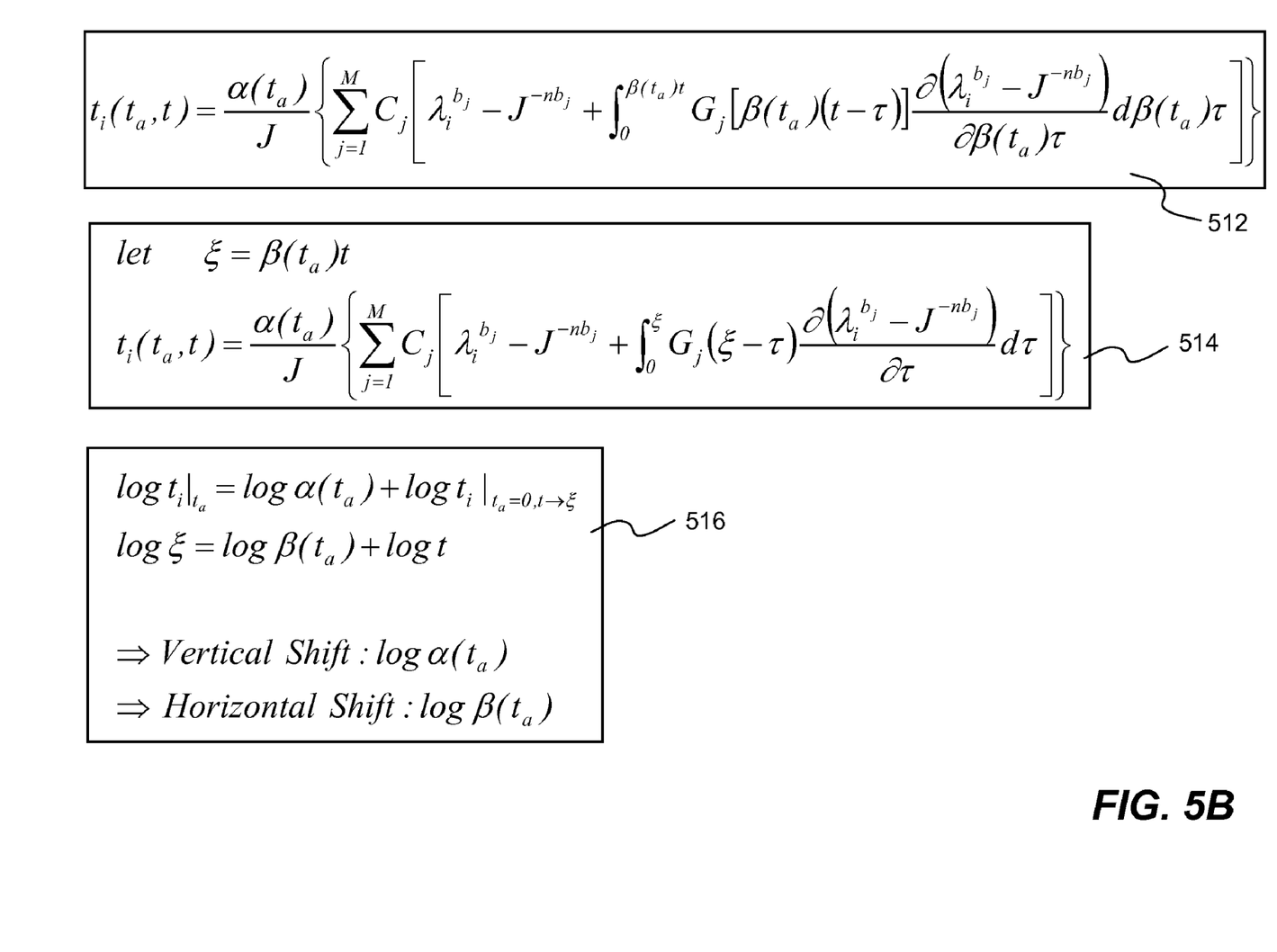
Figure 6:
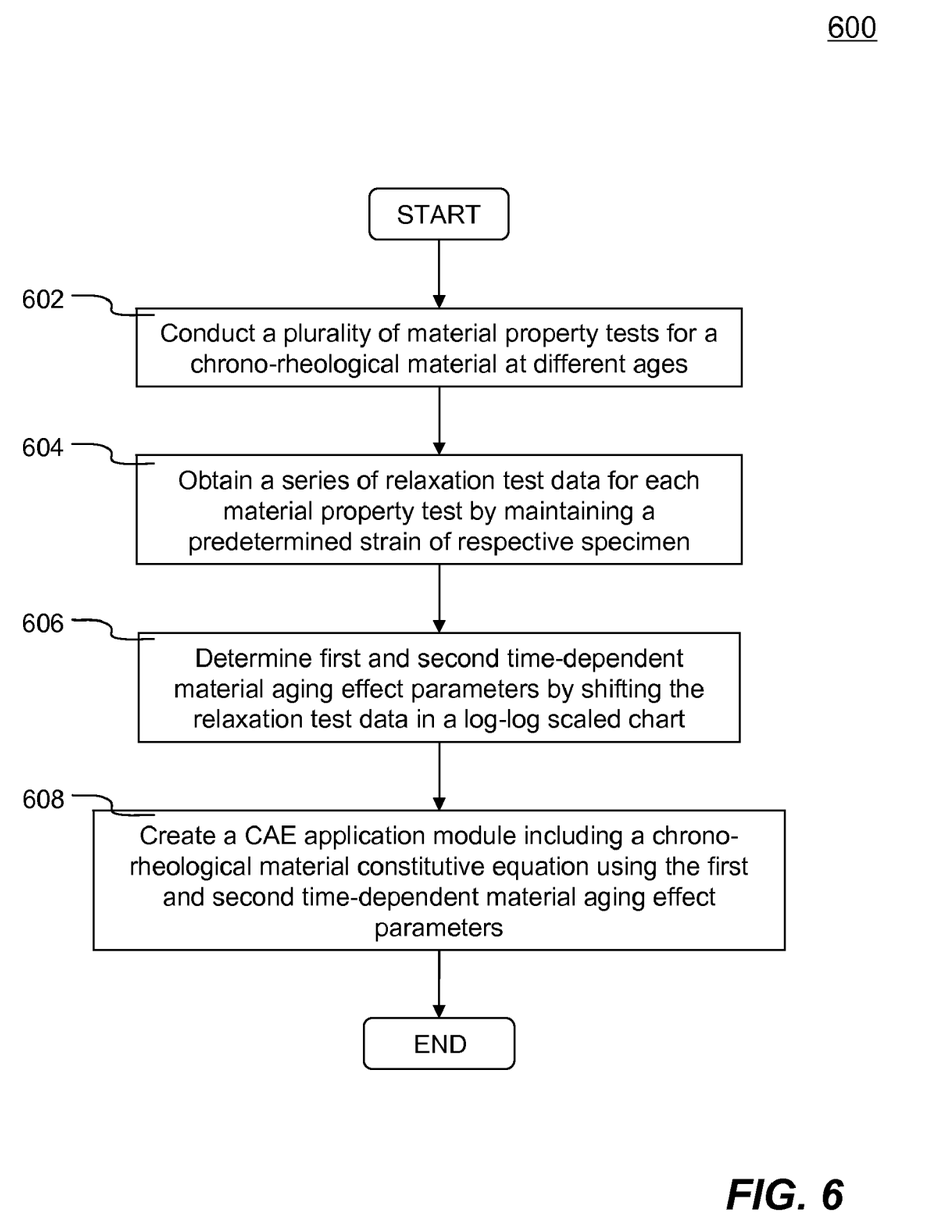
FIG. 6 is a flowchart illustrating an exemplary process of enabling simulation of material aging effect in finite element analysis, according to an embodiment of the present invention.

Referring first to FIG. 6, a flowchart is shown for an exemplary process 600 of enabling simulation of material aging effect in finite element analysis, according to an embodiment of the present invention. Process 600 may be implemented in a computer in conjunction with a material property test lab. Process 600 is preferably understood with FIGS. 1A-5B.

Figure 1A:
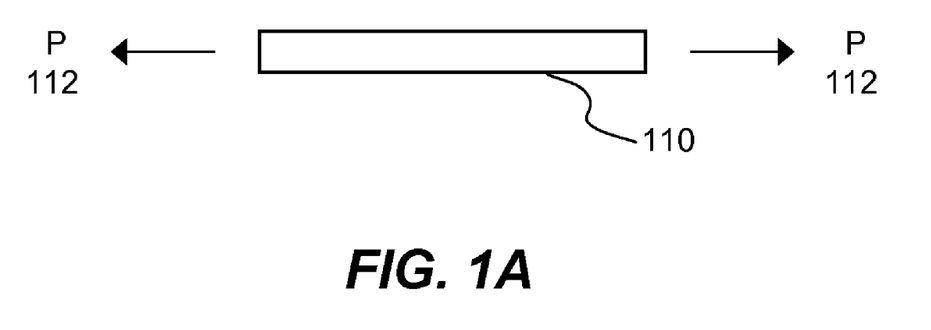
FIG. 1A is a diagram showing an elastomer stick specimen under a uni-axial tension condition.
Figure 1B:
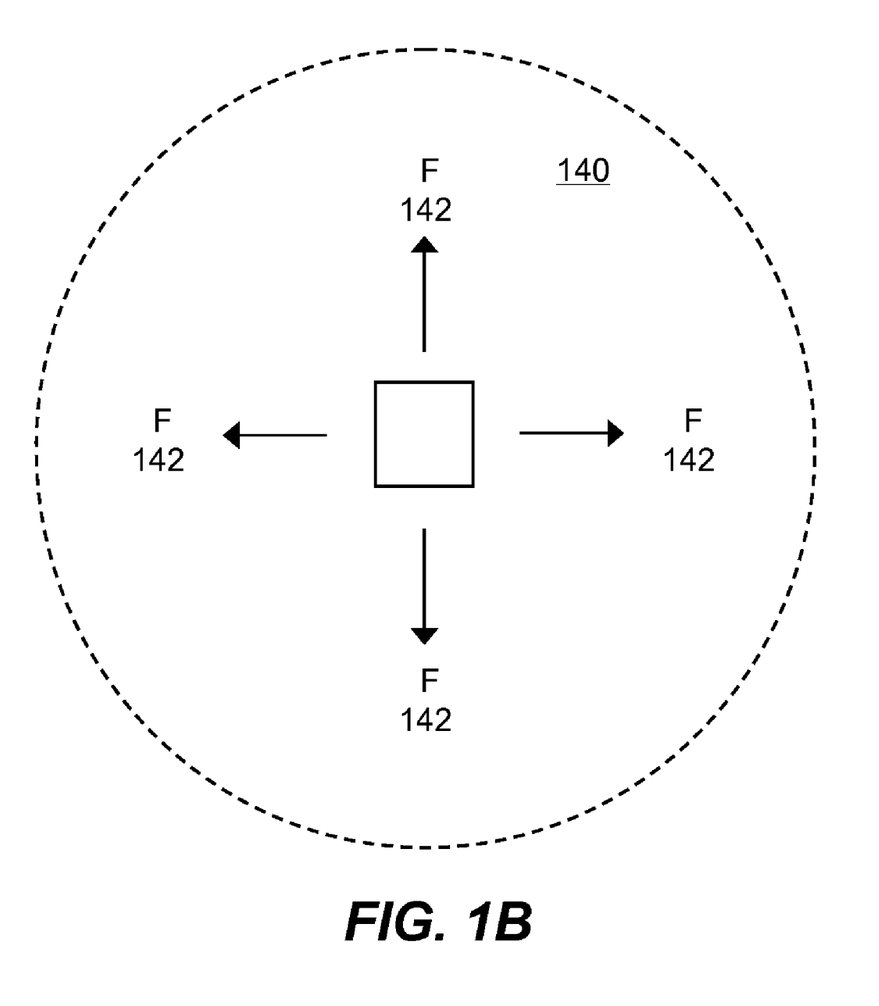
FIG. 1B is a diagram showing a sheet of elastomer membrane specimen under a bi-axial tension condition.

At the onset, a set of material property tests is conducted for a chrono-rheological material of interest at different ages at step 602. The material property tests may be performed by applying uni-axial tension/compression (FIG. 1A) or bi-axial tension (FIG. 1B). Shown in FIG. 1A, a specimen 110 is under a pair of forces P 112 that forms a uni-axial tension condition, while a specimen 140 is under a bi-axial tension condition with tension forces F 142 in both directions in FIG. 1B. Bi-axial tension can be obtained by inflating a substantially round shape membrane specimen in a bi-axial tension test apparatus, which is a well-known procedure to those of ordinary skilled in the art. The material property tests are so configured that the chrono-rheological material properties at different age (e.g., days, weeks, months, etc.) are obtained with repeating substantially identical test on different aged specimens. One method is to conduct the material property tests chronically so that each of a group of the specimens would become different ages.

Each material property test is configured to obtain a series of relaxation test data by maintaining a pre-determined constant strain or displacement (e.g., stretch or elongation) of respective specimen at step 604. For example, holding the specimen 110 in a uni-axial tension test to the pre-determined strain requires a pair of forces P 112 at certain magnitude initially. As time progresses, material properties of the specimen 110 change thereby requiring different magnitude of the forces to maintain the same strain. Similarly, in a bi-axial test, an initial pressure inflates the membrane specimen 140 so that the predetermined strain at the center of the specimen in both directions is reached. The pressure is then adjusted to maintain the same strain over time during the bi-axial test. The relaxation test data are recorded.

Figure 3:
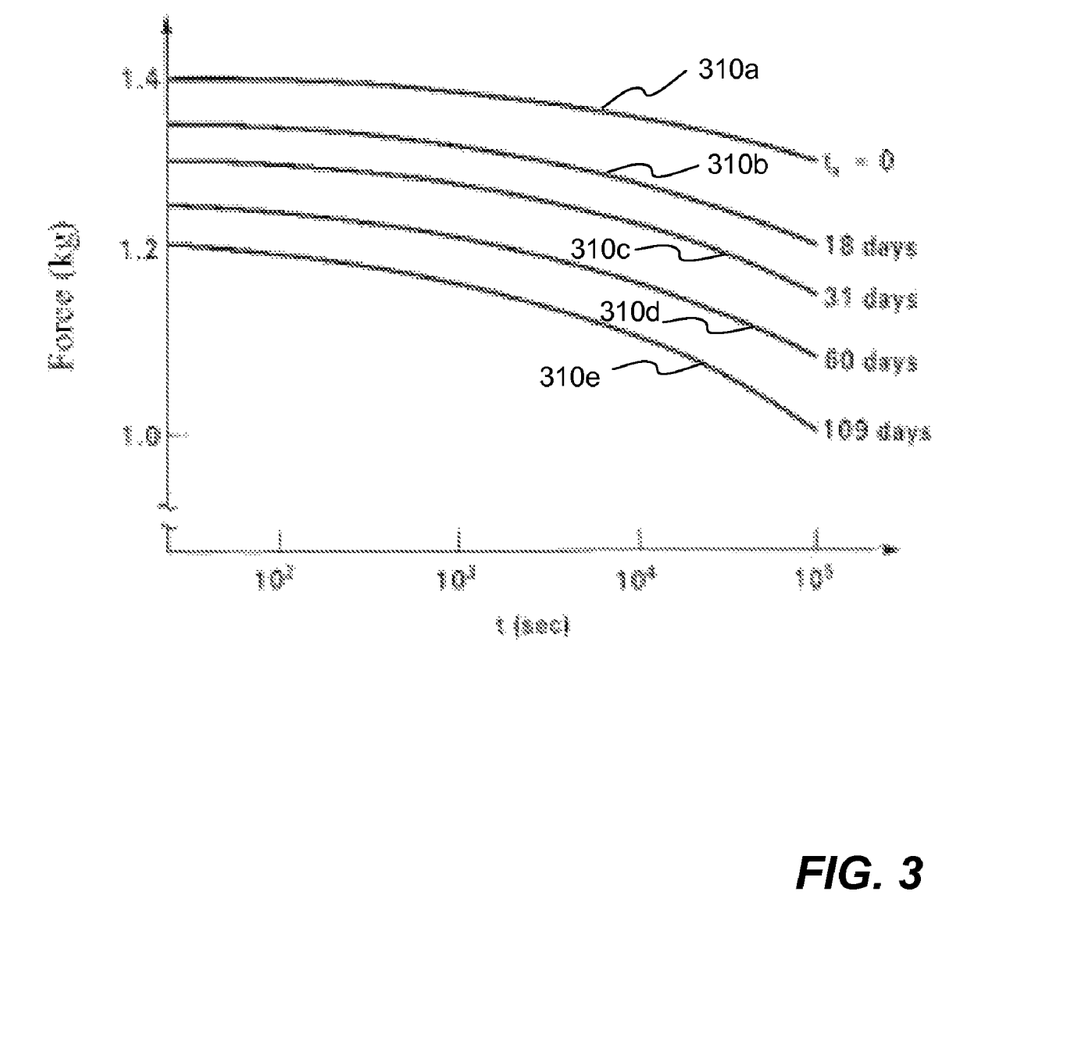
FIG. 3 is a diagram showing a set of exemplary relaxation test data obtained in a uni-axial test, according to an embodiment of the present invention.

In one embodiment, a number of exemplary relaxation test data 310a-e obtained from a uni-axial test procedure are plotted in a force-versus-time chart shown in FIG. 3. Each of the relaxation test data 310a-e represents results from specimens at different age (i.e., 0-day, 18-day, 31-day, 60-day and 109-day). In another embodiment, several exemplary relaxation test data 410a-e from a bi-axial test procedure are plotted in diagram 400 of FIG. 4A. The diagram 400 is a pressure-time chart in a logarithm-logarithm scale with results 410a-e of five material property tests plotted therein. Each the results 410a-e represents a series of relaxation test data. The set of material property tests is performed chronically to include effects of specimen with different ages. Shown in the diagram 400, the results of the five tests 410a-e are obtained at different ages (i.e., 1-day, 1-week, 1-month, 3-month and 6-month).

Referring back to FIG. 6, at step 606, process 600 determines a set of first and second time-dependent material aging effect parameters by shifting and matching the obtained test results. For example, in the diagram 400, each pair of the five test results 410a-e are matched by shifting in both pressure and time directions. The pressure direction is indicated by arrow 412 and the time direction by arrow 414. After shifting and matching, the five shifted test results 440a-e are plotted in diagram 430 shown in FIG. 4B.

Figure 2A:
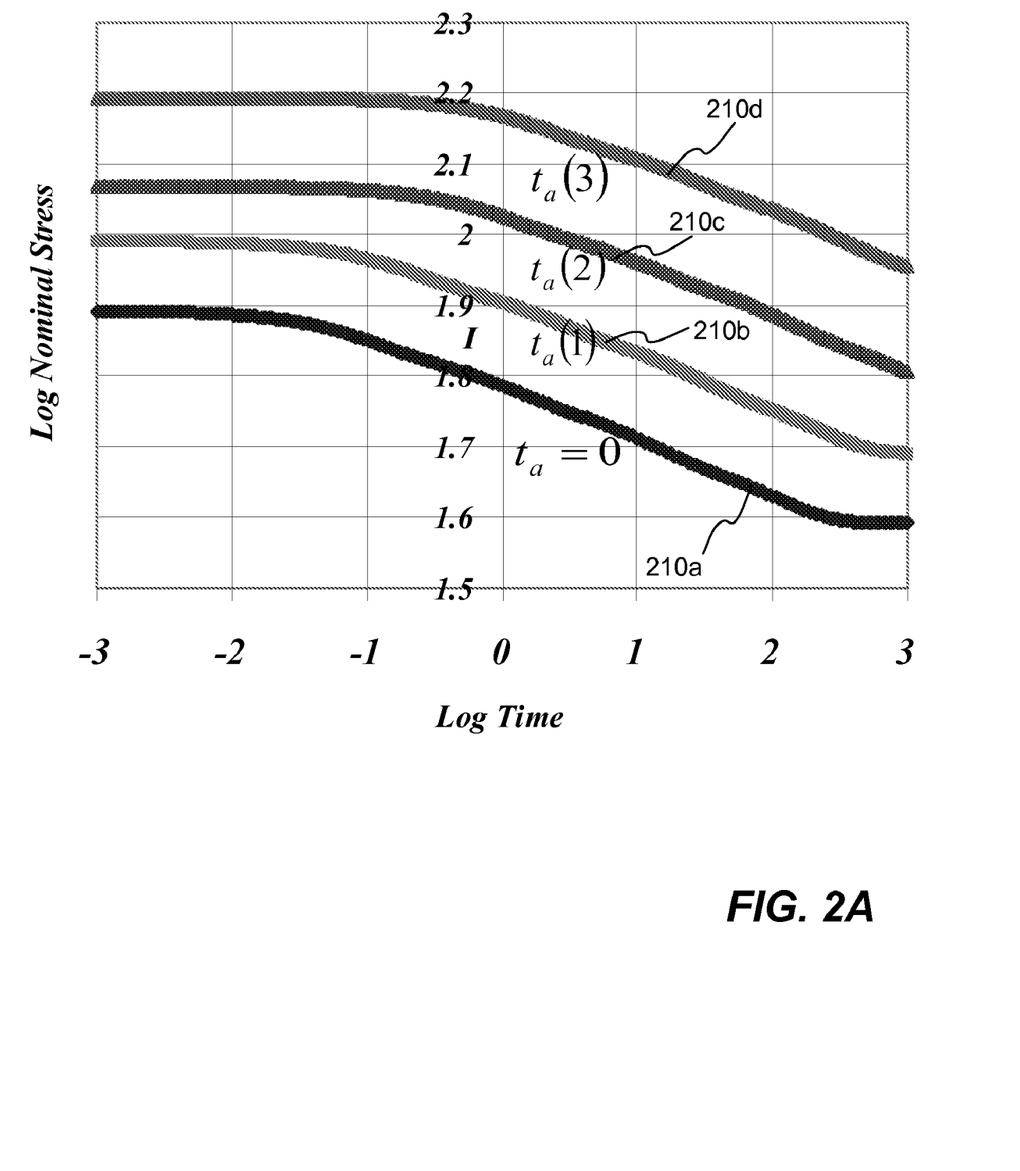
FIG. 2A shows a series of exemplary simulated relaxation test data in accordance with one embodiment of the present invention.
Figure 2B:
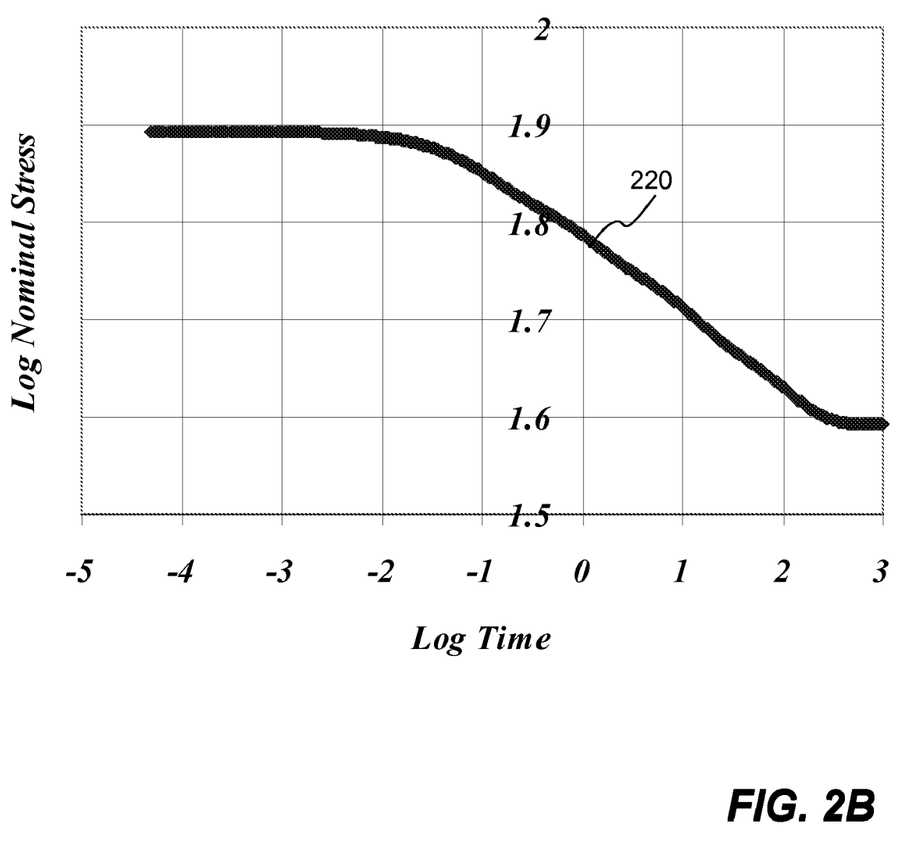
FIG. 2B shows the master curve for the series of simulated relaxation test data of FIG. 2A.

To further demonstrate how the present invention works, a numerical example shown in FIGS. 2A-B. Simulated relaxation test data 210a-d are calculated for a uni-axial specimen under compression load at four different ages (i.e., $t_a=0$, $t_a(1)$, $t_a(2)$ and $t_a(3)$). Nominal stress is plotted against relaxation time in the material property test. The stretch ratio of the material is 0.8, which corresponds to 20% compressive strain in the specimen. The material is compressible and the compressibility is represented numerically (n=10). The long-term material constants M, $C_j$ and $b_j$ are set as follows:
M=2, $C_1$=30, $C_2$=3, $b_1$=2 and $b_2$=−2. The relaxation function is represent series:

$$g_j(t) = C_j \sum_{k=1}^{N} R_k e^{-\gamma_k t}$$

This relationship also links the viscoelastic properties with the elastic properties through the constants $C_j$. The material constants $C_j R_m$ are in the units of stress, and $\gamma_m$ are decay constants. The viscoelastic material constants are:

| k | $R_m$ | $\gamma_m$ |
|---|-------|------------|
| 1 | 0.50  | 0.01       |
| 2 | 0.50  | 0.10       |
| 3 | 0.50  | 1.00       |
| 4 | 0.50  | 10.00      |

The simulated relaxation test data 210a-d are plotted in FIG. 2A. Using vertical and horizontal shifts of the simulated relaxation test data 210a-d, a master curve 220 is resulted and shown in FIG. 2B. A set of first and second time-dependent material aging effect parameters $\alpha(t_a)$ and $\beta(t_a)$ at various aging times are:

|         | $\alpha(t_a)$ | $\beta(t_a)$ |
|---------|---------------|--------------|
| $t_a=0$   | 1.00          | 1.00         |
| $t_a(1)$  | 1.25          | 0.50         |
| $t_a(2)$  | 1.50          | 0.10         |
| $t_a(3)$  | 2.00          | 0.05         |

The values for $\alpha(t_a)$ and $\beta(t_a)$ between these aging times can be obtained from extrapolation between two adjacent values.

Then, at step 608 of process 600, a finite element analysis application module is created (e.g., programmed and compiled) to include a chrono-rheological material constitutive equation that uses the set of first and second time-dependent material aging effect parameters obtained in the material property tests. The finite element analysis application module with a chrono-rheological material constitutive equation included (i.e., programmed) therein can then be used for simulating material aging effect in a structure containing at least in part the chrono-rheological material.

According to one embodiment, an exemplary chrono-rheological material constitutive equation is shown in FIGS. 5A-B. Formula 502 defines the principal Cauchy stress $t_i(t)$ of viscoelastic highly compressible material in terms of stretch ratios $\lambda_i$. Strain of the material is defined as $(\lambda_i-1)$ and subscript "i" represents each of the three directions in space. Material constants $C_j$, $b_j$ and n are determined from long-term test data (i.e., t=∞) and relaxation function, $g_j(t)$, from relaxation test data of an unaged specimen.

The relaxation function $g_j(t)$ can be taken as a series of exponential functions and can be assumed to have a form shown in formula 504. $R_m$ are dimensionless material constants and $\gamma_m$ are decay constants. When the relaxation function $g_j(t)$ is substituted by another relaxation function $G_j(t)$, formula 502 becomes formula 506, because $C_j$ is a common term that can be factored out.

For material aging effect in a chrono-rheological material, formula 508 is developed to include the first and second time-dependent material aging effect parameters $\alpha(t_a)$ and $\beta(t_a)$ and $t_a$ as the aging time. Formulas 512, 514 and 516 are derived to shown correlation of formula 508 and the vertical shift log $(\alpha(t_a))$ and the horizontal shift log $(\beta(t_a))$ in obtaining the two parameters from the material property test.

The constitutive equation for viscoelastic materials can often be described by the Volterra integral equation of the first kind. In general the method presented herein can be extended to linear, quasi-linear, Hill-foam viscoelastic constitutive equations and to the Volterra integral equation of the first kind.

Figure 7:
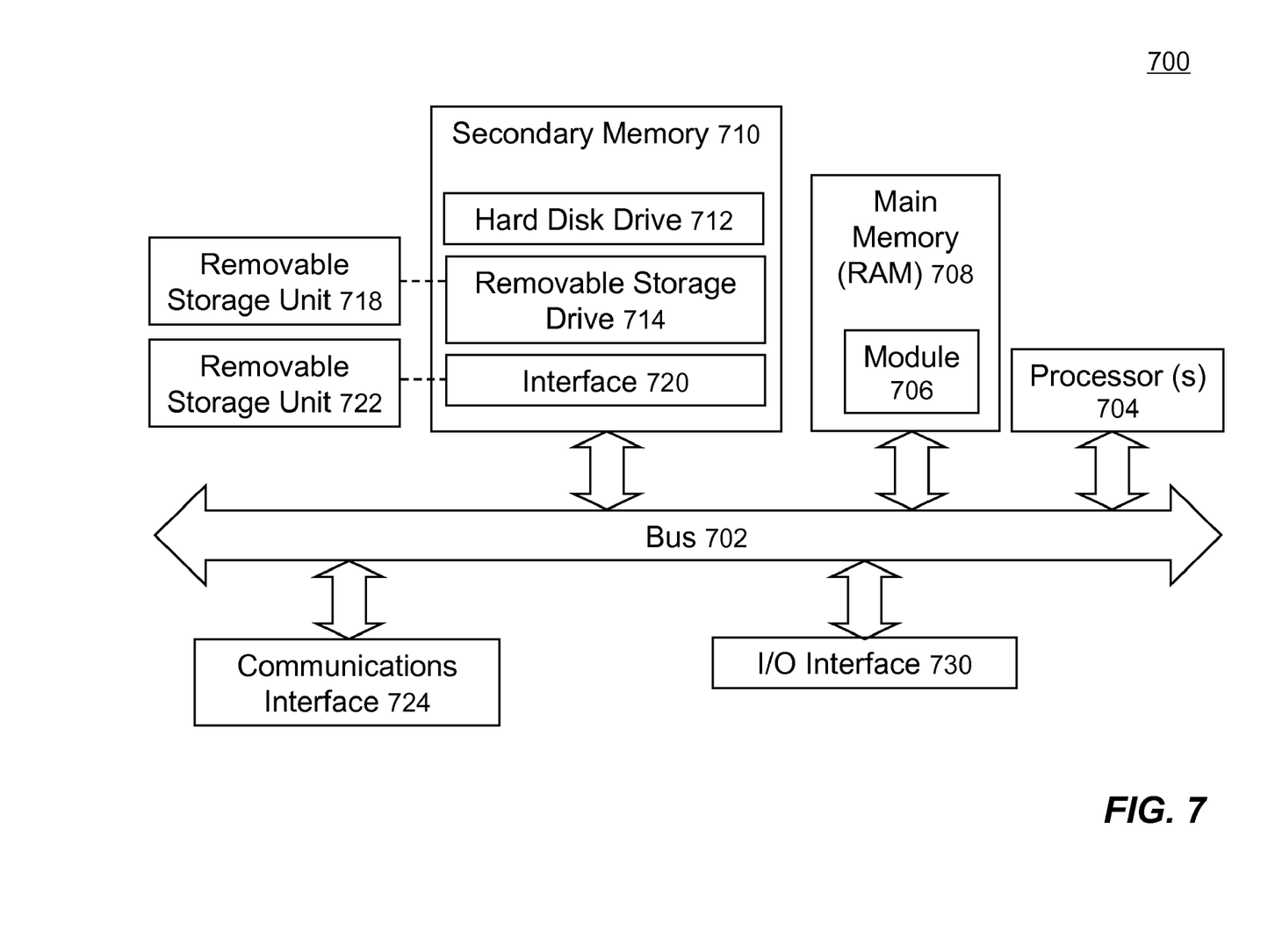
FIG. 7 is a function diagram showing salient components of a computing device, in which an embodiment of the present invention may be implemented.

According to one aspect, the present invention is directed towards one or more computer systems capable of carrying out the functionality described herein. An example of a computer system 700 is shown in FIG. 7. The computer system 700 includes one or more processors, such as processor 704. The processor 704 is connected to a computer system internal communication bus 702. Various software embodiments are described in terms of this exemplary computer system. After reading this description, it will become apparent to a person skilled in the relevant art(s) how to implement the invention using other computer systems and/or computer architectures.

Computer system 700 also includes a main memory 708, preferably random access memory (RAM), and may also include a secondary memory 710. The secondary memory 710 may include, for example, one or more hard disk drives 712 and/or one or more removable storage drives 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc. which is read by and written to by removable storage drive 714. As will be appreciated, the removable storage unit 718 includes a computer usable storage medium having stored therein computer software and/or data.

In alternative embodiments, secondary memory 710 may include other similar means for allowing computer programs or other instructions to be loaded into computer system 700. Such means may include, for example, a removable storage unit 722 and an interface 720. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 722 and interfaces 720 which allow software and data to be transferred from the removable storage unit 722 to computer system 700. In general, Computer system 700 is controlled and coordinated by operating system (OS) software, which performs tasks such as process scheduling, memory management, networking and I/O services.

There may also be a communications interface 724 connecting to the bus 702. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728 which may be electronic, electromagnetic, optical, or other signals capable of being received by communications interface 724. The computer 700 communicates with other computing devices over a data network based on a special set of rules (i.e., a protocol). One of the common protocols is TCP/IP (Transmission Control Protocol/Internet Protocol) commonly used in the Internet. In general, the communication interface 724 manages the assembling of a data file into smaller packets that are transmitted over the data network or reassembles received packets into the original data file. In addition, the communication interface 724 handles the address part of each packet so that it gets to the right destination or intercepts packets destined for the computer 700. In this document, the terms "computer program medium", "computer usable medium" and "computer readable storage medium" are used to generally refer to media such as removable storage drive 714, and/or a hard disk installed in hard disk drive 712. These computer program products are means for providing software to computer system 700. The invention is directed to such computer program products.

The computer system 700 may also include an input/output (I/O) interface 730, which provides the computer system 700 to access monitor, keyboard, mouse, printer, scanner, plotter, and alike.

Computer programs (also called computer control logic) are stored as application modules 706 in main memory 708 and/or secondary memory 710. Computer programs may also be received via communications interface 724. Such computer programs, when executed, enable the computer system 700 to perform the features of the present invention as discussed herein. In particular, the computer programs, when executed, enable the processor 704 to perform features of the present invention. Accordingly, such computer programs represent controllers of the computer system 700.

In an embodiment where the invention is implemented using software, the software may be stored in a computer program product and loaded into computer system 700 using removable storage drive 714, hard drive 712, or communications interface 724. The application module 706, when executed by the processor 704, causes the processor 704 to perform the functions of the invention as described herein.

The main memory 708 may be loaded with one or more application modules 706 (e.g., finite element analysis application module with a chrono-rheological material constitutive equation programmed or configured therein) that can be executed by one or more processors 704 with a user input (e.g., the set of first and second material aging effect parameters determined from relaxation test data obtained in material property tests) through the I/O interface 730 to achieve desired tasks. In operation, when at least one processor 704 executes one of the application modules 706, the results are computed and stored in the secondary memory 710 (i.e., hard disk drive 712). The result and/or status of the finite element analysis (e.g., car crash simulation including material aging effect within a crash dummy of a FEA model) are reported to the user via the I/O interface 730 either in a text or in a graphical representation to a monitor coupled to the computer.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. For example, whereas chrono-rheological material has been described as elastomer, other materials are included, for example, rubber, foam, etc. Furthermore, the material property test has been described and shown as uni-axial tension test of specimen, a compression test can be used instead. Finally, the inventors would like to acknowledge the term of chrono-rheological material was suggested by Dr. Lydia T. Lee and Dr. James P. Berry of Kaiser Permanente Medical Group in Martinez, Calif. In summary, the scope of the invention should not be restricted to the specific exemplary embodiments disclosed herein, and all modifications that are readily suggested to those of ordinary skill in the art should be included within the spirit and purview of this application and scope of the appended claims.

What is claimed is:

1. A method of enabling simulation of material aging effects in a computer aided engineering (CAE) analysis, the method comprising:

conducting a plurality of identical material property tests for respective specimens of a particular chrono-rheological material, each of the specimens having been aged to a different age and each of the tests being configured to obtain a series of relaxation test data of a corresponding one of the specimens, wherein each of the series of relaxation test data is measured by maintaining the corresponding specimen at a predetermined displacement or strain;

determining a set of first and second time-dependent material aging effect parameters that correlates the series of relaxation test data of a pair of the specimens; and configuring a CAE analysis application module such that the material aging effects can be represented numerically with a chrono-rheological material constitutive equation having the set of first and second time-dependent material aging effect parameters included therein, the CAE analysis application module is used for performing a CAE analysis of an engineering structure that contains at least in part the chrono-rheological material, wherein the CAE analysis is used for assisting a user to make decision in improving design of the engineering structure.

2. The method of claim 1, wherein said each of the material property tests comprises a uni-axial test procedure with the relaxation test data being axial stress of the corresponding specimen.

3. The method of claim 1, wherein said each of the material property tests comprises a bi-axial test procedure with the relaxation test data being inflating pressure of the corresponding specimen.

4. The method of claim 1, wherein said determining the set of first and second time-dependent material aging effect parameters further comprising:

plotting the series of relaxation test data of said pair of the specimens as first and second curves on a two-dimensional logarithm-logarithm scaled chart having a vertical axis representing relaxation test data and a horizontal axis representing time of the test; and shifting the first curve to match the second curve in the chart.

5. The method of claim 4, wherein the first time-dependent material aging effect parameter is a vertical shift amount of said shifting operation.

6. The method of claim 4, wherein the second time-dependent material aging effect parameter is a horizontal shift amount of said shifting operation.

7. The method of claim 1, wherein the chrono-rheological material constitutive equation defines a strain-stress relationship of the chrono-rheological material.

8. The method of claim 1, wherein said different ages are between one-day and six-month.

9. A system for simulating material aging effects in an engineering structure containing at least in part a chrono-rheological material using a computer aided engineering (CAE) analysis application module running on a computer comprising: a computer configured to perform a CAE analysis of the engineering structure by receiving a set of first and second time-dependent material aging effect parameters from a user input as a result of conducting a plurality of identical material property tests for respective specimens of a chrono-rheological material, each of the specimens having been aged to a different age and each of the tests being configured to obtain a series of relaxation test data of a corresponding one of the specimens, wherein each of the series of relaxation test data is measured by maintaining the corresponding specimen at a predetermined displacement or strain, the set of first and second time-dependent material aging effect parameters is determined by correlating the series of relaxation test data of a pair of the specimens, wherein the set of first and second time-dependent material aging effect parameters is associated with a chrono-rheological material constitutive equation configured in the CAE analysis application module; and performing the CAE analysis of the engineering structure including the material aging effect in accordance with the chrono-rheological material constitutive equation.

10. The system of claim 9, wherein said correlating the series of relaxation test data of said pair of the specimens further comprising:
    plotting the series of relaxation test data of said pair of the specimens as first and second curves on a two-dimensional logarithm-logarithm scaled chart having a vertical axis representing relaxation test data and a horizontal axis representing time of the test; and
    shifting the first curve to match the second curve in the chart.

11. The system of claim 10, wherein the first time-dependent material aging effect parameter is a vertical shift amount of said shifting operation.

12. The system of claim 10, wherein the second time-dependent material aging effect parameter is a horizontal shift amount of said shifting operation.

13. The system of claim 9, wherein said different ages are between one-day and six-month.

14. A computer program product comprising a non-transitory computer readable storage medium having a computer readable program for simulating material aging effect in an engineering structure containing at least in part a chrono-rheological material, wherein the computer readable program when executed on a computer causes the computer to perform the steps of: receiving a set of first and second time-dependent material aging effect parameters from a user input as a result of conducting a plurality of identical material property tests for respective specimens of a particular chrono-rheological material, each of the specimens having been aged to a different age and each of the tests being configured to obtain a series of relaxation test data of a corresponding one of the specimens, wherein each of the series of relaxation test data is measured by maintaining the corresponding specimen at a predetermined displacement or strain, determining the set of first and second time-dependent material aging effect parameters that correlates the series of relaxation test data of a pair of the specimens, wherein the set of first and second time-dependent material aging effect parameters is associated with a chrono-rheological material constitutive equation configured in a computer aided engineering (CAE) analysis application module; and performing the CAE analysis of the engineering structure including the material aging effect in accordance with the chrono-rheological material constitutive equation.

15. The computer program product of claim 14, wherein said determining the set of first and second time-dependent material aging effect parameters further comprising:
    plotting the series of relaxation test data of said pair of the specimens as first and second curves on a two-dimensional logarithm-logarithm scaled chart having a vertical axis representing relaxation test data and a horizontal axis representing time of the test; and
    shifting the first curve to match the second curve in the chart.

16. The computer program product of claim 15, wherein the first time-dependent material aging effect parameter is a vertical shift amount of said shifting operation.

17. The computer program product of claim 15, wherein the second time-dependent material aging effect parameter is a horizontal shift amount of said shifting operation to match said each pair.

18. The computer program product of claim 14, wherein said different ages are between one-day and six-month.

* * * * *